United States Patent Office 2,947,746
Patented Aug. 2, 1960

2,947,746
NEW PREPARATION OF SUBSTITUTED PHENOX-
AZINES AND INTERMEDIATES THEREFOR

Michael P. Olmsted, Gladwyne, Pa., assignor to Smith Kline & French Laboratories, Philadelphia, Pa., a corporation of Pennsylvania No Drawing. Filed May 14, 1959, Ser. No. 813,082

8 Claims. (Cl. 260—244)

This invention relates to a novel method for the preparation of phenoxazines. Furthermore, this invention relates to novel intermediate in this method.

More specifically, this invention solves the problem of preparing in good yield phenoxazine intermediates having utility in the preparation of N-alkylated phenoxazines having pharmacodynamic activity, particularly antiepileptic or transquilizing activity. Exemplary of such alkylated phenoxazines is 10-(2-1'-piperazinylethyl)-phenoxazine (see Horclois, Australia, 201,628). Others are described in a co-pending application, Serial No. 754,131, filed August 11, 1958. The intermediates prepared by the method of this invention are represented by the following structural formula:

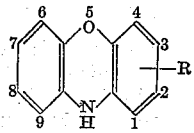

in which R represents halogen with a maximum atomic weight of 80, lower alkoxy, lower alkyl or trifluoromethyl; all preferably in the 2-position. The method of this invention is particularly important in preparing 2-trifluoromethylphenoxazine and this aspect of the invention is a preferred modification as will be disclosed hereafter. The terms "lower alkoxy" and "lower alkyl" are used to denote moieties with a maximum of two carbon atoms, preferably methoxy and methyl.

There are several general methods of preparing phenoxazines in the prior art. Perhaps the most widely used is an Ulmann-like condensation of a 2-amino-2'-halo-diphenyl ether (see Horclois patent noted above). Considerable experimentation has demonstrated that the prior art processes give low yields of substituted phenoxazines with a considerable amount of decomposition of the starting materials. This is particularly true with the preferred trifluoromethyl substituted compounds which are an important aspect of this invention.

The process of this invention which, therefore, solves a difficult problem in the prior art consists in N-formylation of a 2-amino-2'-halo-diphenyl ether prior to ring closure. More specifically, the procedure is as follows:

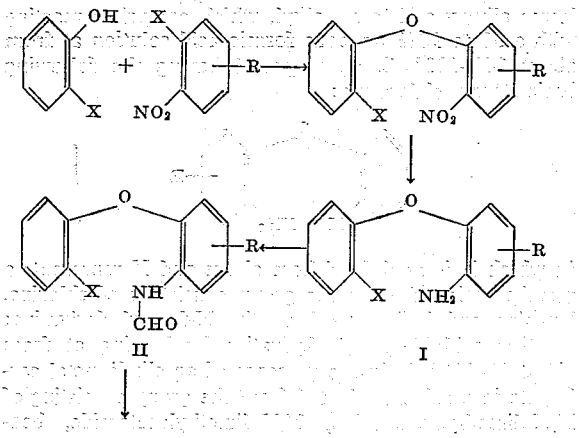

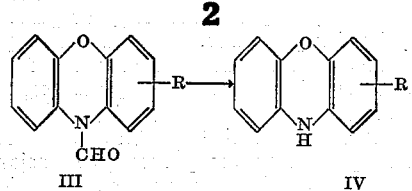

The starting materials for the process of this invention are either known to the art or are prepared by condensing a 2-halophenol with an X-substituted 2-halonitrobenzene to give the 2'-halo-2-nitro-diphenyl ether which is then reduced either chemically or catalytically, to the desired 2-amino-2'-halo-diphenyl ether derivative (I).

This diphenyl ether of Formula I when X is a reactive halogen of atomic weight greater than 36 such as iodo or preferably bromo and R is as described above is used as starting material for the method of this invention. Alternatively R may be substituted in the halo containing ring. This substituted aminohalodiphenyl ether is N-formylated, preferably as a melt, with a concentrated aqueous solution of formic acid such as from 50% to 98% formic acid. Of course, other concentrations of formic acid solution can be used as long as enough formic acid is present to form the formate salt but with little advantage beyond the ranges described here. Advantageously commercial formic acid solution is used about 85 to 95%. The formylation can also be carried out in other ways such as reaction with an ester such as methyl formate but aqueous formic acid solutions are particularly useful from a commercial viewpoint. The formylation in aqueous solution is advantageously carried out at temperatures of from about 140–180° C., preferably about 160° C. The crude residue from the formylation reaction is represented by Formula II above with X and R as described herebofore.

The resulting 2-formamido-2'-halodiphenyl ether intermediate is then cyclized by heating with one molar equivalent or preferably an excess of an alkali earth carbonate, for example sodium bicarbonate, potassium carbonate or sodium carbonate preferably in the presence of a copper catalyst such as copper bronze, copper powder or a copper salt preferably cupric carbonate. The reaction is run in a high boiling solvent in which the reactants are at least partially soluble such as a liquid tertiary acid amide such as N-dimethylformamide, N-dimethylacetamide or an aromatic solvent such as benzene, xylene or toluene.

The reaction is run at elevated temperatures such as from about 80° C. to about 250° C. advantageously from about 100° C. to 150° C. for prolonged periods such as from 10 to 48 hours. The reaction is usually run at the boiling point of the reaction mixture.

A particularly advantageous modification of the method of this invention is to employ a high boiling aromatic solvent in the cyclization reaction which distills azeotropically with water. It has been found that the intramolecular cyclization of the diphenyl ether proceeds with great difficulty but removing the water from the reaction mixture as it is formed gives greatly enhanced yields. The solvent is preferably benzene or a substituted benzene which forms azeotropic mixtures with water such as benzene, toluene or xylene. Xylene has been found to be especially useful. It is convenient to either reflux the reaction solvent over any conventional water trap or co-distill the solvent and water whichever is desirable. Of course other solvents azeotropic with water in the temperature ranges noted in which the reactants are substantially soluble can be substituted for the aryl solvents described above.

The cyclization reaction usually gives the N-formyl derivative of Formula III, in which R is as noted above, which must be hydrolyzed preferably with alkali such as with dilute sodium or potassium hydroxide solution to give the desired phenoxazine. In some cases the N-formyl intermediate is hydrolyzed completely or partially during the cyclization procedure. In general, it is preferred to carry out the overall reaction as outlined above in one reaction vessel without isolating the respective N-formyl intermediates.

It will be understood that substituents not described here can be present on the phenoxazine nucleus other than those described above as long as such moieties are not reactive under the reaction conditions of the process. It is surprising that phenoxazines can be prepared in good yield by the method of this invention because steric considerations make intramolecular condensation of diphenyl ethers to phenoxazines particularly difficult and not predictable from the known course of reactions of corresponding phenothiazine congeners. Highly electronegative substituents on the diphenyl ether nucleus make the condensation even more difficult. The formylation method under azeotropic distillation conditions which is the basis of this invention makes such phenoxazines readily available. Of course variations of this method will be apparent to those skilled in the art however the following examples will make apparent the essential details of this invention.

Example 1

A mixture of 261 g. of 2-bromophenol, 340 g. of 3-nitro-4-chlorobenzotrifluoride and 20 ml. of water is stirred while 94 g. of potassium hydroxide is added slowly for 15 minutes. The mixture is heated at 110–115° C. for three hours. Water (200 ml.) is added. The organic layer is distilled to give 2-nitro-4-trifluoromethyl-2'-bromodiphenyl ether, B.P. 140–155° C. at 0.5 mm.

A mixture of 387 g. of the nitro compound and 475 g. of iron filings in 1750 ml. of water is stirred at reflux temperature for three hours while 1 l. of glacial acetic acid is gradually added. After refluxing for 3 hours, the mixture is cooled and thoroughly extracted with benzene. The residue from the extract is 2-amino-4-trifluoromethyl-2'-bromodiphenyl ether.

A mixture of 61 g. of the amine and 159 g. of 90% formic acid is heated to a liquid temperature of about 160° C. Water and excess formic acid are allowed to distill off. The remaining volatiles are taken off the crude 2-formamido-4-trifluoromethyl-2'-bromodiphenyl ether by applying a vacuum of 20–30 mm. The crude formy derivative is mixed with 17 g. of potassium carbonate, 1 g. of cupric carbonate and 100 ml. of xylene. The mixture is heated at reflux over a water separator for 20 hours. A solution of 8 g. of sodium hydroxide in 50 ml. of water is added to the xylene solution of N-formyl-2-trifluoromethylphenoxazine and the mixture is heated at reflux for two hours. The mixture is diluted with water and benzene sufficiently to completely dissolve the solid. The benzene layer is removed and the residue vacuum distilled to give a 70% yield of 2-trifluoromethylphenoxazine, M.P. 149–152° C.

Example 2

A mixture of 290 g. of 2,5-dichloronitrobenzene, 261 g. of 2-bromophenol and 20 ml. of water is stirred while 94 g. of potassium hydroxide is added. After heating at 110° C. for four hours and working up as in Example 1, 4-chloro-2-nitro-2'-bromodiphenyl ether is removed, B.P. 180–195° C. at 1 mm. This compound, 243 g., and 387 g. of iron filings and 1450 ml. of water is refluxed while 820 ml. of glacial acetic acid is added. The procedure of Example 3 gives 2-amino-4-chloro-2'-bromodiphenyl ether, B.P. 170–185° C. at 1 mm.

A mixture of 206 g. of this amine and 65 g. of 90% formic acid is heated to 160° C. then vacuum is applied. The residue is 2-formamido-4-chloro-2'-bromodiphenyl ether. This material is mixed with 65 g. of potassium carbonate and 3 g. of cupric carbonate in 300 ml. of xylene. The mixture is azeotropically distilled for 17 hours to give, after working up as in Example 1, a 68% yield of 2-chlorophenoxazine, M.P. 143–146° C.

Example 3

A mixture of 29 g. of 2-chloro-4-methoxy-nitrobenzene and 29.5 g. of 2-iodophenol in 10 ml. of water is reacted with sodium hydroxide as in Example 1 to give 2-nitro-5-methoxy-2'-iododiphenyl ether. This compound is reduced with platinum oxide in 200 ml. of ethyl alcohol at 60 p.s.i. The catalyst is removed and the solvent evaporated from the solvent to give 2-amino-5-methoxy-2'-iododiphenyl ether.

This amine (23.6 g.) and 68 g. of 88% formic acid is heated to 170–175° C. The residue, after stripping the mixture, is 2-formamido-5-methoxy-2-iododiphenyl ether. This formamide is then mixed with 65 g. of sodium carbonate, 4 g. of copper-bronze powder and 400 ml. of toluene. After distilling the mixture azeotropically for 24 hours, the mixture is worked up as in Example 1 to give the N-formyl derivative and after hydrolysis, 3-methoxyphenoxazine.

Example 4

A mixture of 16 g. of 2-amino-4-methyl-2'-bromodiphenyl ether, prepared by reacting 2-chloro-5-methylnitrobenzene with 2-bromophenol and reducing to the amine as in Example 1, and 32 g. of formic acid is heated to 180° C. The resulting formamide intermediate together with 35 g. of potassium carbonate, 1.5 g. of cupric carbonate and 150 ml. of xylene is heated azeotropically for 15 hours. The mixture is extracted with benzene to give the N-formyl derivative. This compound is hydrolyzed with dilute potassium hydroxide to give 2-methylphenoxazine.

Example 5

A mixture of 8 g. of 2-amino-4-fluoro-2'-bromodiphenyl ether, prepared by reacting 2-chloro-5-fluoronitrobenzene with 2-bromophenol and reducing the amine catalytically as in Example 3, and 16 g. of 90% formic acid solution is heated to 165° C. After pulling off the volatiles in vacuo, the crude formamido intermediate is obtained. This compound is cyclized with 18.5 g. of potassium carbonate, 1 g. of cupric carbonate in 100 ml. of benzene as in Example 1 to give the crude formyl and the desired 2-fluorophenoxazine.

What is claimed is:
1. The method of forming compounds having the following basic structural formula:

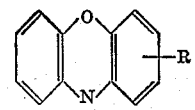

in which R represents a member selected from the group consisting of trifluoromethyl, fluorine, chlorine, bromine, lower alkoxy and lower alkyl, which comprises reacting with a 50 to 98% aqueous formic acid solution at from about 140–180° C. a compound having the following basic structural formula:

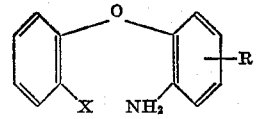

in which R is as defined here above and X represents a member selected from the group consisting of chlorine, bromine and iodine, to form the N-formyl derivative: reacting said N-formyl derivative by heating at from about 80–250° C. in the presence of an alkali metal carbonate in a solvent selected from the group consisting of N,N-dimethylformamide, N,N-dimethylacetamide, benzene, xylene and toluene to form a N-formyl compound having the following basic structural formula:

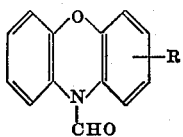

in which R is as defined here above; and reacting said N-formyl compound with an aqueous solution of a member selected from the group consisting of sodium hydroxide and potassium hydroxide.

2. The method of claim 1 characterized in that the solvent for the cyclization reaction is a member selected from the group consisting of benzene, toluene and xylene and the reaction is run with azeotropic distillation of said member.

3. The method of claim 2 characterized in that R is a 2-trifluoromethyl moiety.

4. The method of claim 3 characterized in that X is bromo.

5. A chemical intermediate having the following basic structural formula:

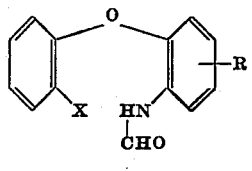

in which X is a member selected from the group consisting of chlorine, bromine and iodine and R is a member selected from the group consisting of trifluoromethyl, fluorine, chlorine, bromine, lower alkyl and lower alkoxy.

6. A chemical intermediate having the following basic structural formula:

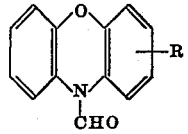

in which R is a member selected from the group consisting of trifluoromethyl, fluorine, chlorine, bromine, lower alkyl and lower alkoxy.

7. 2-amino-4-trifluoromethyl-2′-bromodiphenyl ether.

8. 2 - formamido - 4 - trifluoromethyl - 2′ - bromodiphenylether.

No references cited.